Figure 1:
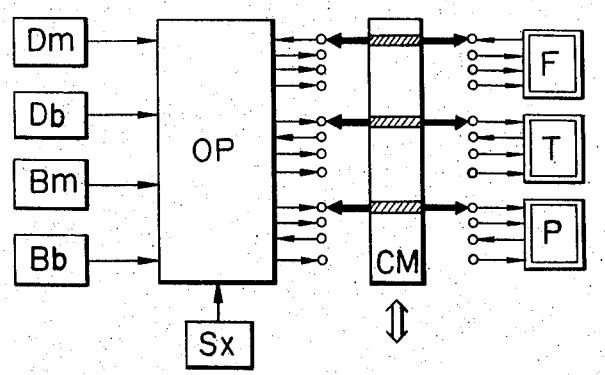

United States Patent [19]
Uchiyama et al.

[11] 3,836,920
[45] Sept. 17, 1974

[54] EXPOSURE CONTROL SYSTEM FOR FLASH PHOTOGRAPHY

[75] Inventors: Takashi Uchiyama, Yokohama; Tetsuya Taguchi, Kawasaki; Yukio Mashimo, Tokyo, all of Japan

[73] Assignee: Canon Kabushiki Kaisha, Tokyo, Japan

[22] Filed: Feb. 15, 1973

[21] Appl. No.: 332,595

[30] Foreign Application Priority Data
Feb. 16, 1972   Japan.............................. 47-16166

[52] U.S. Cl................................. 354/27, 354/149
[51] Int. Cl. .......................................... G03b 7/16
[58] Field of Search........................ 95/10 CE, 53 E

[56] References Cited
UNITED STATES PATENTS

| | | | |
|---|---|---|---|
| 3,591,829 | 7/1971 | Murata et al. ........................ | 95/10 X |
| 3,710,701 | 1/1973 | Takishima et al.................... | 95/10 UX |

*Primary Examiner*—Joseph F. Peters, Jr.
*Assistant Examiner*—Michael L. Gellner
*Attorney, Agent, or Firm*—Toren, McGeady and Stanger

[57] ABSTRACT

In the flash photography exposure control system disclosed, an illuminating device produce flash light quantity P for a main portion and subordinate portion of an object to be photographed. A shutter device opens for a time T and closes on the basis of the light from the illumination means. Distance measuring means measure the distance $Dm$ to the main portion of the object. A diaphragm arrangement cooperates with the shutter device and produces a diaphragm value F for adjusting the exposure amount. A brightness measuring device measures the brightness $Bm$ of the main portion and the brightness $Bb$ of the subordinate portion of the object. Operating means adjust at least two of the following parameters: flash light quantity P, the opening time T of the shutter device, and the diaphragm value F of the diaphragm device determined by the distance obtained by the distance measuring means and brightness obtained by the brightness measuring means. The operating means thus produces a proper exposure which takes into account the natural light and flash light supplied to the main and subordinate portions of the objects.

7 Claims, 17 Drawing Figures

EXPOSURE CONTROL SYSTEM FOR FLASH PHOTOGRAPHY

This invention relates to an exposure control system for flash photography for providing correct exposure of the objects being photographed over the entire lighting range.

A counter-lighting state refers to a situation where the intensity of illumination of a principal object under ambient conditions or its brightness level is different from that of a subordinate object which is usally at a further distance than that of the principal object. Therefore, the principal object is dark and the subordinate object is light or vice versa. The ambient illumination is defined as not only sunlight but also artificial ambient illumination other than flash, for example, the illumination of energized luminescent bulbs.

In taking photographs of subjects in counter-lighting situations if no flash illumination is used, the pricipal object will be underexposed. In order to avoid such a result by use of flash illumination, and further to effect correct exposure even for the subordinate object the camera aperture is adjusted to a value computed by dividing a guide number of an associated flash unit by the distance to the principal object. Then, the exposure time is set at a certain appropriate value computed in accordance with said present aperture value and the brightness level of the subordinate object illuminated with natural light. Such an approach, however, results in over-exposure for both the principal and subordinate objects, for it does not take into account the influence of natural ambient illumination on the prinicpal object as well as the influence of flash illumination on the subordinate object.

In order to prevent the principal object from being overexposed, an alternative approach of an half-stop advance of the diaphragm aperture setting from a preliminarily computed value has been used. Even with this approach, however, the probability that correct exposure occurs is very low too. Even if an automatic exposure control device which performs the computations and setting operations corresponding to the manual ones described above were coupled, unsatisfactory exposure of the film would be likewise effected although the time-consuming process of computation and setting operations might be eliminated.

This invention realizes an exposure condition evaluating device for flash photography capable of evaluating the exposure conditions in the form of combination of at least a pair of optimum values of exposure parameters in response to the brightness distribution of the subject being photographed and the range of distance to the subject. With this device, optimum exposure may be computed and set for not only the principal object but also subordinate objects by manual adjustment of the exposure parameters according to the indication of the device, or by automatic adjustment of the exposure parameters and thus, the device is of very high utility.

Before this invention is explained with reference to the drawings, consideration will first be given to a light evaluation approach which is utilized when photographing subjects in the flash mode in the counter-lighting situation. In this approach, how the exposure value which produces correct exposure over the entire luminance of a subject comprising a principal object and a subordinate object is determined will be derived. In the alternative, to what values the exposure parameters, namely, exposure time, aperture value and quantity of light energy available from a given flash device should be adjusted in response to a given subjject lighting situation, that is, the flash device-to-principal and subordinate object distances and the brightness levels of the both objects in accordance with the sensitivity of associated photographic material or the film sensitivity will be derived by computation hereinafter. In general, the flash device is used in the neghborhood of the camera so that distances may be considered to coincide with those from the camera.

A. Exposure value based on the intensity of natural illumination

By general definition, let the brightness of a subject illuminated with natural ambient light (including all the ambient lights except the flash light) be B, the preset diaphragm value be $F$ and the magnification of an image focused by the camera lens be $M$, then the illuminance of the film plane is expressed by $I$ $$I = \pi \cdot B/4F^2 \cdot 1/(M+1)^2 \quad (1)$$

(wherein F is an effective F number associated with lens transmittance)

In general photographic situations except in very close photographic situations, or in photographic situations wherein the subject is at so far a distance that the magnification may be considered to vanish, equation (1) becomes $$I = \pi \cdot B/4F^{B/}4F^2 \quad (2)$$

By multiplying illuminance $I$ by an effective exposure interval during which the camera shutter is opened to expose the film under natural ambient illumination, an exposure amount $Ed$ which is integrated on the film plane is obtained:

$$Ed = I \cdot T = \pi \cdot B/4F^2 \cdot T \quad (3)$$

In order that the exposure amount $Ed$ produces correct exposure of the film, an exposure value determined by applying to equation (3) the general formula of exposure meters for use in determing the exposure time (calibration formula of exposure meters)

$$T = K \cdot F/B \cdot Sx \quad (4)$$

(wherein $Sx$ represents the film sensitivity, K is a calibration constant, and $B$ is the luminance of a plain light source which may be considered to be equal to the subject brightness defined in equation 1-3) should coincide with a desired predetermined value $E_0$. Hence we have $$(Ed =) \pi \cdot B/4F^2 \cdot K \cdot F/B \cdot Sx = \pi K/4Sx = E_0 \quad (5)$$

In this case, correct exposure will be effected for the subject brightness under natural ambient illumination.

B. Exposure value based on the intensity of flash illumination

The amount of light energy given off by a flash device is usually expressed in Beam Candle Power Seconds (B.C.P.S.). Now let this amount of light energy be $P$, the distance from the flash device to a subject being photographed be $D$, and the diffuse reflectance of the subject be rd. Then, a flash exposure value $Ef$ at a selected diaphragm value $F$ is expressed as $$Ef = P/D^2 \cdot rd \cdot 1/4F^2 \qquad (6)$$

In equation (6), the amount of light energy $P$ does not represent the maximum amount of light energy which would be produced by the flash device if the flashing were permitted to continue for its full duration, but it represents the amount of flash light energy contributed to the effective exposure of the film. Therefore, when the flashing is interrupted, or when the shutter is closed before the flashing is terminated, the amout of light energy $P$ contributed to the exposure of the film during the exposure interval will be reduced. To have correct exposure for the luminance of the subject being photographed under flash illumination only, that is, to make $Ef$ equal to $E_0$, the diaphragm value $F$ should be adjusted to a value $F_0$ in response to the distance $D$ and flash light value $P$, $F_0$ being a solution of the following equation.

$$P/D^2 \cdot rd \cdot 1/4F_0^2 = \pi K/4Sx = E_0 \qquad (7)$$

When the diaphragm aperture F is set at any value other than $F_0$, the amount of light energy which is integrated on the film plane becomes from equations (6) and (7)

$$Ef = \pi \cdot K/4Sx \cdot F_0^2/F^2 \qquad (8)$$

Guide numbers are frequently used as a factor correlating light energy available from a flash source with distance, so that, for form's sake, an equation correlating guide number G with the amount of light energy $P$ will be derived. In order that the subject at distance $D$ is correctly exposed, the diaphragm value should be adjusted to a predetermined value $F_0$ from equation (7), thereby distance $D$ and diaphragm aperture $F_0$ may be factored into guide number G.

$$G = D \cdot F_0 \qquad (9)$$

Substituting equation (7) to equation (9), we have $$G = \sqrt{rd/\pi k \cdot P \cdot Sx} \qquad (10)$$

In the case of diffuse reflectance rd = 18% and a calibration constant k=13, it becomes $$G = \sqrt{0.0044 \cdot P \cdot Sx} \qquad (11)$$

C. Exposure value based on the intensity of natural-and-flash complex illumination In synchronous flash photography with daylight illumination, the subject receives simultaneously natural ambient and flash illumination, so that the exposure amount E which is integrated on the film plane is the sum of Ed and Ef defined above. From equation (3) and equation (8), the exposure value is defined by $$E = Ed + Ef = \pi B/4F^2 T + \pi K/4Sx \cdot F_0^2/F^2 \qquad (12)$$

In the following, the exposure value will be determined on the basis of the luminance of the principal object and the luminance of the subordinate object separately, and thereafter an exposure value consistent with each of the exposure values thus determined will be determined, which will produce a correct exposure for the entire range of luminance of the subject being photographed.

The principal and subordinate object brightnesses effected by natural ambient illumination are herein designated as Bm and Bb respectively. In actual cases, the principal object as well as the subordinate object are not always made of a field of uniform brightness, but of a field of portions of different brighness, but as is seen in the conventional photography under ambient illumination, Bm and Bb are herein defined as representing average brightnesses of their respective objects, or the brightnesses of their respective portions for which photographers desire to effect correct exposure.

The principal and subordinate object distances are designated as Dm and Db respectively. Every object usually has a depth, but Dm herein is defined as representing a distance to an object to which the camera lens is focused in focusing adjustment when photographing, while Db represents an average distance of a number of objects with which a scene is dotted to a considerable depth, or a distance to an object for the brightness of which photographers particularly desire to make correct exposure. The distance herein defined is measured from the flash device when the flash device, is located in isolation from the camera. The symbols relating to the principal object will be hereinafter suffixed with m and the symbols relating to the subordinate object with b.

From equation (12), it is apparent that in the synchronous flash photography under daylight illumination at a selected diaphragm aperture F and exposure time T, the exposure amounts Em and Eb for the principal and subordinate objects respectively are $$Em = Edm + Efm = \pi Bm/4F^2 \cdot T + \pi K/4Sx \cdot Fom^2/F^2 \qquad (13)$$

$$Eb = Edb + Efb = \pi Bb/4F^2 \cdot T + \pi K/4Sx \cdot Fob^2/F^2 \qquad (14)$$

In equations (13) and (14), Fom and Fob represent diaphragm values at which correct exposure can be made respectively for the luminances of the principal and subordinate objects illuminated by the flash light only, so that from equation (9)

$$G = Dm \cdot Fom \qquad (15)$$

$$G = Db \cdot Fob \qquad (16)$$

In order to make correct exposure for both of the principal and subordinate object luminances, exposure values should satisfy the following equations.

$$Em = Eb = E_0 \qquad (17)$$

Substituting into these equations their respective values and solving them, wer get equation (18) and equation (19)

In the case of $c < 1$ and $Cf < 1$, or $C > 1$ and $Cf > 1$ $$F = G/Dm \; \frac{\sqrt{(1 - C \cdot Cf^2)/(1-C)}}{P \cdot Sx \; \sqrt{(1 - C \cdot Cf^2)/(1-C)}} = 1/Dm \; \sqrt{rd/\pi K}$$
$$= \sqrt{T} \; \sqrt{Sx \cdot Bb/K} \; \sqrt{(1 - C \cdot Cf^2)/(1 - Cf^2)} \qquad (18)$$

(wherein $C = Bm/Bb$, $Cf = Dm/Db$)

In the case of $C = Cf = 1$ ($Bm = Bb$ and $Dm = Db$)

$$T = K/Sx \cdot Fom^2/Bb \, ((F^2/Fom^2) - 1) = K/Sx \cdot 1/Bb(F^2 - (G^2/Dm^2)) \qquad (19)$$

Why each of equations (18) and (19) which are solutions of simultaneous equations (17) is conditional, and what meanings they have will now explained briefly. The reason why parameters $C$ and $Cf$ in equations (18) and (19) are conditional is based on the requisite that $F$, $T$, $P$ (or $G$) should be positive real numbers, and the conditions of equation (18) have such a meaning that of the principal and subordinate objects, the one having a smaller brightness should be located nearer the flash device.

The conditions of equations (19) mean that the principal and subordinate objects should be located adjacent each other, and that the brightnesses of the both objects should be equal to each other. Such a photographic situation is very rare as a practical case. Therefore, as far as synchronous flash photography under daylight illumination is concerned, condideration may be focused on equation (18).

The reason that the exposure value for providing correct exposure throughout a range of luminance of the entire subject cannot be derived from equation (18) unless an object of a smaller brightness is present at a shorter distance than that of the other is based on the assumption that the flash device is to be used in the neighborhood of the camera. Therefore, if the flash device is spaced apart from the camera so far as, for example, being positioned further than the principal object from the camera, that the flash light illuminates only the subordinate object of which the luminance is smaller than that of the principal object, it will be possible to effect correct exposure throughout a range of luminance of the entire subject of which an object of a smaller brightness is present at a further distance. Modified equations for computing exposure values applicable to such photograhic situation can be derived. In this case, it is to be noted that the influence of flash illumination on the objects depends on the distance not from the camera but from the flash device. This approach suggests that illumination of transmitting type may be used when an correct image is formed by superimposing image elements.

The above-described equations for computing exposure values have been derived assuming that the size of the aperture through which incident light passes, that is, the diaphragm value does not vary during the exposure interval between the opening of the shutter to begin the exposure and the closing of it to terminate the exposure.

Therefore, the other shutter mechanisms which are so constructed, for example, that the above equations have to be modified for shutter blades are built in the diaphragm blades and on actuation of the shutter, the area of the aperture is increased at a predetermined speed under control. For example, the exposure amount Ed based on the intensity of ambient natural illumination must not be expressed by equation (3) of the form in the terms of diaphragm value F and exposure time T, but in terms of Ev. Further when a speed light flash unit of a short flashing period is used, the diaphragm value F in equation (8) for computing the exposure, amount Ef based on the intensity of flash illumination should be an aperture value occuring at the instant at which the flash light emits. When a flash bulb of a long flashing period is used, the influence of the light output variation as well as the aperture variation on the exposure amount should be taken into account to determine an equivalent diaphragm value, because the light output of the flash bulb varies during the flashing. On the basis of the above-mentioned approach, alternative equations may be written, or the original equations derived so far may be modified so as to be applicable to any of shutter mechanisms. But the procedure for evolving the original equations would not be explained briefly, and the formalism of the modified equations would be so abstract that the conformation with the functions of the photographic device would become ambiguous. Therefore, the above-described equations will not be developed any more. It is, however, to be understood that the description "to perform operations, functions, controls based on the above-described equations" is herein made as including shutter mechanisms of such special types as mentioned above.

Consideration to equation (18) in reference with photographic equipment and photographic situations which may be encountered leads to the following description.

In a given photographic situation, the brightnesses Bm, Bb and distances Dm, Db are settled (C and Cf are also settled), and further the film sensitivity Sx is settled according to the type of films used. Therefore, in synchronous flash photography under daylight illumination, the exposure factors which are adjustable by human operation (including automatic mechanical operation) to effect correct exposure over the entire range of luminace of the subject being photographed are only three exposure conditions, namely, diaphragm value F, exposure time T and light energy P available from a flash device except flash devices of the type of which the light energy P cannot be altered by human control (including automatic control). When the subject lighting situation and film sensitivity are given, the relationship among exposure parameters F, T, P will be established based on equation (18), and in turn each exposure parameter may be adjusted to any value inasmuch as equations (18) are satisfied. In practice, however, the adjustment ranges of the exposure parameters are restricted by instrumentation of the photographic equipment. Accordingly, it is natural that the selected values of the exposure parameters should be such that the number of subject lighting situations which can be correctly exposed over the entire range of luminace of the subject being photographed are as many as possible. Otherwise, it will happen the preselection of a very small exposure time in disregard to very low intensity of illumination of the subject being photographed requires an extremely small diaphragm value to be set, and in an extreme case, it will result in the aperture diameter determined by computation exceeding the maximum adjustable aperture diameter.

Even if one of the three exposure parameters F, T, P cannot be adjusted by human operation, i.e. manually or automatically, correct exposure throughout a wide range of the subject luminance will be effected by the consistent adjustment of the other two parameters, thereby, equation (18) is satisfied. For example, even if the quantity of light energy P available from the flash device cannot be varied, correct exposure for the entire subject luminance will be effected by adjusting exposure control parameters, F and T, to values, as determined by equations (18).

In case two of the three exposure parameters, F, T, P, are not adjustable by human operation, any adjustment of the other one parameter cannot generally effect correct exposure over the entire range of luminance of the subject being photographed, except that it so happens that the exposure control parameter values, as determined by evaluating the photographic subject situation encountered satisfy equations (18). This rule, however, does not apply to the case where the requirement for accuracy of exposure control is made rigorous to the extent that the subordinate object may be incorrectly exposed, as far as the principal object is correctly exposed.

In case any of the three exposure control parameters, F, T, P, is not adjustable, correct exposure will be made over the entire range of luminance of the subject being photographed only when the exposure control parameter values, as determined by evaluating the encountered subject lighting situation satisfy the equation (18). In general, occurrence of such coincidence is impossible.

Next, this invention will be explained in detail with reference to the drawings. In FIG. 1, there are illustrated an arithmetic unit OP for performing the function of computing exposure values which provide correct exposure based on a function of the exposure control parameters, and a change-over means CM. $Dm$, $Db$, $Bm$ and $Bb$ denote as before the distances and brightnesses of the principal and subordinate objects respectively. $Sx$ denotes the sensitivity of each type of film used. F, T and P denote as before the exposure parameters, namely, diaphragm value, exposure time and light energy available from the flash device to be used, respectively. When the change-over means CM is set as shown in FIG. 1, signals representing values $Dm$, $Db$, $Bm$ and $Bb$ dependent on a photographic subject situation encountered, and a signal representing a value, $Sx$, dependent on each type of associated film are introduced to arithmetic unit OP, while a signal representing the diaphragm value, F, preset at a desired predetermined value is also introduced to arithmetic unit OP. Responsive to all the inputs, the arithmetic unit OP performs the computation based on equations (18) to derive the remaining two exposure control parameter values, T and P, thereby the resultant outputs are permitted to display their respective values, or to control their respective adjustment mechanisms through change-over means CM. The one-step downward slide progression of change-over means CM from the first position shown in the figure permits T to be set to a desired predetermined value and the one-step additional progression permits P to be set to a desired predetermined value, thereby each of the signals representing the selected values are derived as the outputs. When change-over means CM is set at the lowest position of the figure, all of the three exposure control parameter values are derived as the outputs. In this case, however, it is necessary to incorporate into the arithmetic unit OP, for example, an arithmetic subunit for performing the function of determining at least one of the three exposure control parameter values, F, T, P, in connection with at least one of the values, $Dm$, $Db$, $Bm$, $Bb$ and $Sx$. On operation of this arithmetic subunit, a functional relationship which allows for F, T, P is established to realize a program which permits the arithmetic unit OP to determine their respective values, F, T, P, based on a function of F, T, P, that is, equations (18), when the arithmetic unit performs the function of solving equations (18). As an example of the program there exists an exposure control system, wherein the diaphragm value F is derived as a function of the principal object distance $Dm$, light energy P and film sensitivity $Sx$ (or, $Dm$ and guide number G) by means of the incoporated arithmetic subunit, while the remaining two exposure control parameter values, namely, exposure time value, T, and light energy value, P, are derived as the outputs of the arithmetic unit OP for performing the computation based on equations (18). The reason why an additional formula for use in determining individual values is necessary besides equations (18) is based on the fact that, as has been already mentioned in the explanation of equations (18), the adjustment ranges of the exposure control parameters, F, T, P, are of certain values, so that when all of their respective values are derived as the outputs, individual values of F, T and P are not determined by equation (18) alone, although the relationship among them is determined.

In the foregoing explanation, all of the signals have been explained as being presented in the directions indicated by respective arrows, thereby the signals may be transferred through physical, electrical, or optical signal transfer means. In the drawings, blocks labelled as $Dm$, $Db$, $Bm$, and $Bb$ are illustrated as including also their respective detecting means and output means of the detections thereof, and a block labelled as $Sx$ is illustrated as including also a manual or automatical setting means by means of which the sensitivity of each type of film used is set, and an output means responsive to the set value. Blocks labelled as F, T and P are illustrated as including also all the alternative means such as those for adjusting their respective values in conformance with the outputs of arithmetic unit OP, those for controlling the exposure adjustment system responsive to the selected values to make an optimum exposure, and those for displaying the outputs of arithmetic unit OP which will teach photographers to what values the exposure control parameters should be adjusted. The computing mechanism of arithmetic unit OP may be of physical, electrical, or optical construction, or may be constructed in the form of a combination thereof.

The change-over means CM of FIG. 1 is illustrated as an electrical change-over switch, but it does not limit its use therein, of course. Further, the change-over means CM is illustrated as being capable of performing multiposition actions among four different setting positions, but said change-over means CM may be constructed as suggested in the embodiments illustrated in the figures to follow FIG. 2, wherein a switch of only one setting position is used.

The actual meaning of the description made before as to the adjustment procedure that "one of the values, F, T, P, may be adjusted to a desired predetermined value" is herein to be understood in the sense that when one of the exposure adjustment means labelled as F, T and P is adjustable, for example, when the area of aperture opening of the diaphragm means cannot be adjusted because of the fixed diaphragm assembly, or when the shutter speed cannot be adjusted to all but one speed, or when the light energy of the flash device cannot be adjusted as seen in usual flash units, the other remaining two exposure control parameter values are derived as the outputs of OP without necessity of the photographer operating the exposure adjustment mechanism that is not adjustable. As another possible example, focal plane built-in cameras coupled with flash units are sometimes handled in such a manner that only one shutter speed, for example, 1/60 second is utilized because of the special feature of its shutter mechanism. In this case, the use of only one shutter speed may be considered to belong to the nonadjustable case.

Figure 2:
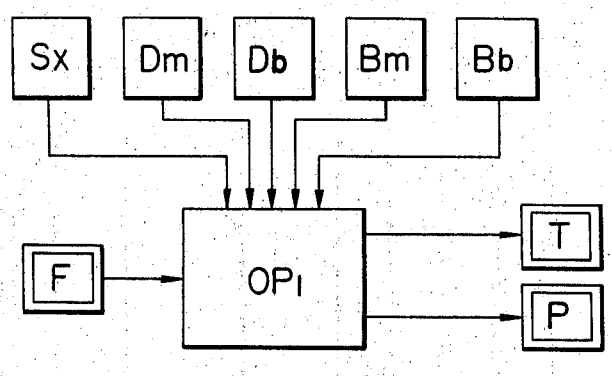

FIG. 2 illustrates a more specific embodiment of the exposure control system of this invention explained with reference to FIG. 1. In FIG. 2, $OP_1$ denotes an arithmetic unit to which information representing values, Dm, Db, Bm, Bb and Sx are presented, and at the same time an information representing diaphragm aperture F preset at a value selected by the free choice of the photographer, or at a certain value selected in synchronism with the coupling of a flash unit is also presented to $OP_1$. Responsive to the value F, $OP_1$ performs the computation based on equations (18) and derives the computed values of exposure time, T, and light energy, P, which when factored into an exposure value provides correct exposure over the entire range of luminance of the subject being photographed. The diaphragm value F may be preset at any desired value, and further, it may follow that diaphragm value F may be adjusted to a certain value in accordance with the principal object distance Dm, Film sensitivity Sx, etc. by the photographer when photographing. In order to eliminate such a time-consuming procedure, all of the exposure control parameters F, T, P, may be formed as outputs. The embodiments in which all the three exposure control parameters are derived as the outputs will be explained later on with reference to the figures to follow FIG. 5.

Blocks labelled as F, T, P, may be replaced with one another, so that the arithmetic unit $OP_1$ is made operative as a function to T or P, though as a function of F in this figure.

Figure 3:
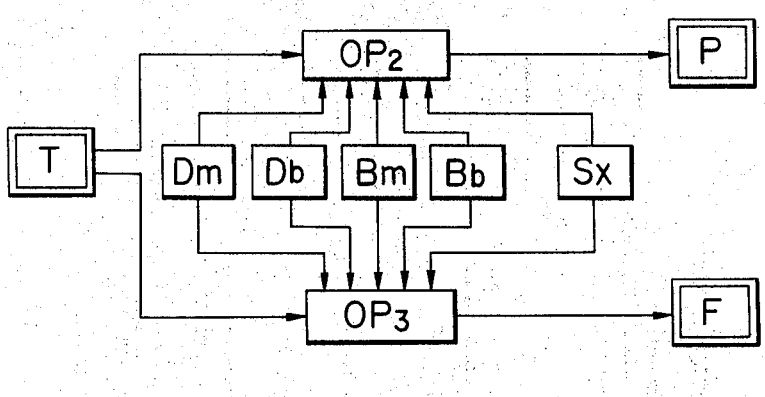

FIG. 3 illustrates another more specific embodiment wherein the arithmetic unit OP is divided into two arithmetic subunits $OP_2$, $OP_3$ positioned in parallel, thereby responsive to values Dm, Db, Bm, Bb and Sx and a desired predetermined value T. The arithmetic subunit $OP_2$ derives a value to which P may be adjusted, while the other arithmetic subunit $OP_3$ derives a value to which F may be adjusted. Blocks labelled as F, T and P, may be replaced with one another, so that the arithmetic unit consisting of $OP_2$ and $OP_3$ is made operative as a function of P, or as a function of F. In manufacturing $OP_2$ and $OP_3$, part of their constructional elements may be made cooperative to perform either function thereof in turn.

Figure 4:
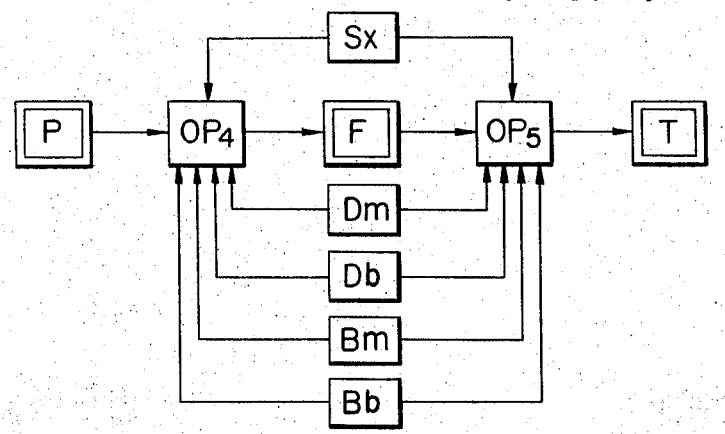

FIG. 4 illustrates a still another more specific embodiment, wherein the arithmetic unit OP is divided into two subunits $OP_4$ and $OP_5$ positioned in series, thereby responsive to values Dm, Db, Bm, Bb and Sx and a desired predetermined value P. The arithmetic subunit $OP_4$ derives a value to which F may be adjusted, then the resultant output of $OP_4$ i.e. the computed value F is directed to the other arithmetic subunit $OP_5$ being also responsive to the values Dm, Db, Bm, Bb and Sx to derive a value to which T may be adjusted.

The arithmetic unit consisting of $OP_4$ and $OP_5$ may be made operative in a procedure of F-prior settlement, or T-prior settlement by replacing F, T, and P with one another.

Figure 5:
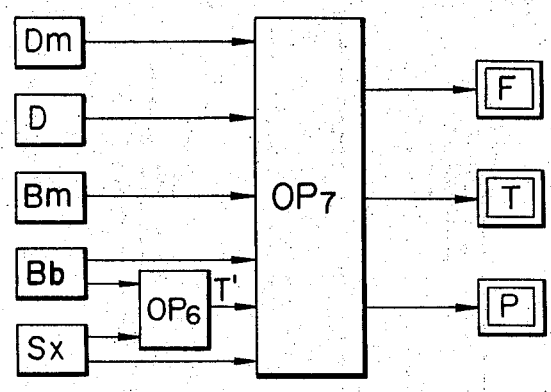

FIG. 5 illustrates an embodiment having a program of which the instruction is favor to the natural illumination factor, in which the arithmetic unit for performing the function of establishing a relationship among the exposure control parameters, F, T, P, and of determining their respective values consists of arithmetic subunits $OP_6$ and $OP_7$. With this program, the arithmetic subunit $OP_6$ makes a preliminary evaluation of an optimum exposure value or an exposure value near the optimum exposure value based on the intensity of ambient natural illumination of a subordinate object assuming that the level of the subordinate object brightness Bb depends on the intensity of ambient natural illumination alone. Actually, the exposure amount depends on the sum of the intensities of natural and flash illuminations. In the photographic synchronous flash lighting situation under daylight illumination, however, the intensity of ambient natural illumination is strong, and the subordinate object which is often situated at farther distances is dimly lit by the flash illumination. Even if the intensity of ambient natural illumination is weak, for example, in the flash phtography in night, this assumption is valid as is obvious from the explanation of equations 18. Then, the output of $OP_6$ is directed to the second arithmetic subunit $OP_7$ responsive to all the values introduced, which performs the function of determining all of the values of the exposure control parameters, F, T, P, to evolve the preliminary exposure value so that an optimum exposure is effected for the entire subject luminance. With the arithmetic unit, such program permits the computed exposure parameter values F, T, P to satisfy equations (18) so that correct exposure is effected in any photograpic subject situation which may be encountered. But is is to be noted that the computed exposure values will be nearly equal to the empirical exposure value valuation made in such a manner that the exposure interval T and diaphragm aperture F are initially determined based on the film sensitivity Sx and the brightness level Bb of the subordinate object illuminated by ambient natural light in isolation from flash light, while light energy P is adjusted in accordance with the principal object distance Dm in conformance with said F value in disregard to the brightness level Bm of the principal object due to the ambient antural illumination. Note that, as is apparent from the foregoing explanation, the determination of both of T and F based on Bb and Sx alone will result in an incorrect exposure.

Therefore, this embodiment has been explained in the emphasis that a combination of values $Bb$ and $Sx$ determine only one exposure control parameter value, but not two or more values of the three exposure control parameters, F, T, P.

The operation of the arithmetic subunits $OP_6$ and $OP_7$ will now be explained in more detail. Information representing film sensitivity Sx and subordinate object brightness $Bb$ are introduced into $OP_6$ as shown in FIG. 5, thereby a preliminary exposure time T' is derived as an output. The computation of T' is performed as follows, for example. In the case of distance ratio $Cf = Dm/Db = 0$, $F/\sqrt{Sx} = 5.6/\sqrt{100} = 0.56$ (F=8 when Sx=200), the arithmetic subunit OP performs a computation corresponding to a formula $\sqrt{T'} \quad \sqrt{Bb/K}$ 0.56 (wherein K is a calibration constant of exposure meters) obtained by substituting the initial conditions into equations (18), and the resultant output T' is then introduced into the second arithmetic subunit $OP_7$. The initial condition $F/\sqrt{Sx} = 0.56$ means that when the speed rating of the associated film is 100, and when the subordinate object is at infinity, or $Cf \approx 0$, $OP_6$ computes a preliminary value T' which when introduced to $OP_7$ permits an ultimately computed value F derived as an output of $OP_7$ to approach 5.6 at which correct exposure is effected for the entire luminace of the subject being photographed. Of course, $F/\sqrt{Sx}$ may be 0.4, 0.8, etc. different from 0.56.

Responsive to inputs Dm, Db, Bm, Bb and Sx as well as an input representing said value T', the second arithmetic subunit $OP_7$ derives the exposure parameter values which satisfy equations (18). As usual, the ultimately computed value T will coincide with the value T' derived as an output of $OP_6$. But when the value T exceeds the adjustment range threshold of the exposure time adjustment mechanism itself, or when the exposure interval is restricted in applicability to, for example, 1/30 second at maximum in flash photography. The value T will be different from the value T', but identical to said limited value. When the value T is identical to the limited value but not to T', the other exposure parameter values F and P are derived as the outputs representing the values which are a combination of solutions of equations (18) solved by substituting the limited value but not T' thereto. The inputs of the first arithmetic subunit $OP_6$ are herein mentioned as representing Bb and Bm, and the output as representing a value identical to T in dimension. This programing may be slightly altered such that the output of $OP_6$ represents a value identical to F in dimension, that is, a preliminary evaluation of diaphragm value is made based on the level of the subordinate object brightness, and thereafter T and P are determined in conformance therewith, or such that information Bm and Bb are introduced into OP which, in turn derives a value identical to T or F in dimention.

Figure 6:
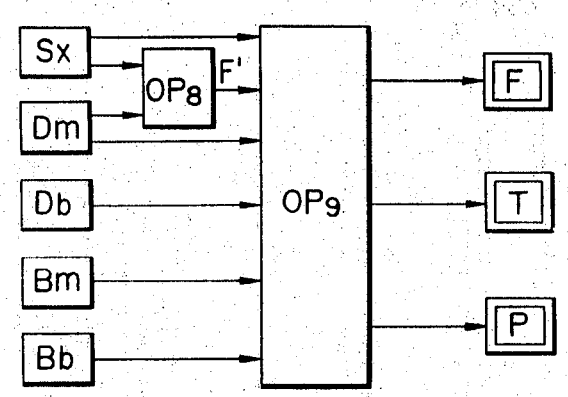

FIG. 6 illustrates an embodiment having a program of which the instruction is favored to flash illumination factor, in which the arithmetic unit for performing the functions of defining a relationship among exposure control parameters, F, T, P, and of computing their individual values, consists of $OP_8$ and $OP_9$. With this program, the arithmetic subunit $OP_8$ makes preliminary evaluation of an appropriate exposure value, or a certain exposure value near the appropriate exposure value based on only the intensity of flash illumination of the principal object assuming that the exposure amount of the principal object usually depends on the intensity of flash illumination. Although the exposure amount depends on the sum of the intensities of flash illumination and ambient natural illumination, the exposure amount of the principal object based on the flash illumination is usually larger than that based on ambient natural illumination when the principal object being photographed in a counter lighting situation in the flash mode is present in a distance usually ranging from 1 meter to 5 meters. Then, the resultant output is introduced into arithmetic subunit $OP_9$. Responsive to all the inputs, arithmetic subunit $OP_9$ performs the function of determining the individual exposure parameter values F, T and P, which when factored into an exposure value provide correct exposure over the entire range of luminance of the subject being photographed. These computed exposure parameter values not only satisfy equations (18), but also will be sometimes nearly equal to those determined without utilizing the instant embodiment by an empirical exposure valuation approach such that the diaphragm value is determined based on the principal object distance Dm and light energy P (P may be factored into a guide number associated with film sensitivity Sx) in disregard to the intensity (Bm) of ambient natural illumination of the principal object.

The operation of the arithmetic subunits $OP_8$ and $OP_9$ will now be explained in more detail. Information representing film sensitivity Sx and principal object distance Dm are introduced into $OP_8$ as shown in FIG. 6, and then a preliminary diaphragm valuation is derived. As an equation (18) defines a relationship between the ultimately computed values of F and P, an arithmetic subunit $OP_8$ performs the function of making a preliminary diaphragm value evaluation based on a formula $F' = 1/Dm \quad \sqrt{rd/\pi K \cdot P' \cdot Sx}$ obtained by substituting into equations (18) the initial conditions, for example, brightness ratio $C = Bm/Bb = 0$, distance ratio $Cf = Dm/Db = 0$, and flash value $P = P'$ (which is equal to the maximum flash energy destined for the flash device itself, or a smaller predetermined value. Then, its output representing the preliminarily computed diaphragm value F' is directed to the second arithmetic subunit $OP_9$. Responsive to the inputs representing F', Sx, Dm, Db, Bm and Bb, the second arithmetic subunit $OP_9$ performs the function of deriving the values of exposure control parameters, F, T, P, satisfying equations (18), thereby the ultimately computed value F will be usually identical to the preliminarily computed value F' when the value F' exceeds the adjustment range threshold of the diaphragm means, or when the value F' falls outside the range between the minimum and maximum diaphragm values, the value F will be identical to the minimum diaphragm value, or the maximum diaphragm value, but not to the value F'. In general, as the intensity of ambient natural illumination of the principal object increases, the ultimately computed flash value P decreases from the initial value P' which is used for the determination of the value F'. Further, as the principal object distance Dm decreases with increase in the value F' above the maximum value (the area of the diaphragm aperture opening is smaller), the ultimate light value P decreases further, for the value F differs from the value F'. Similarly, as the principal object distance Dm increases with a decrease in the value F' below the minimum diaphragm value, the ultimate value P decreases from the initial value P', for the diaphragm aperture set at the value F is larger than that set at the value F'.

It is also valid that the ultimately computed exposure time value T is shorter than that evaluated assuming that the subordinate object is illuminated only by the ambient natural light, and that the exposure is made at the diaphragm value F determined based on the subordinate object brightness Bb, (for the subordinate object also is illuminated by flash light to some extent).

Figure 7:
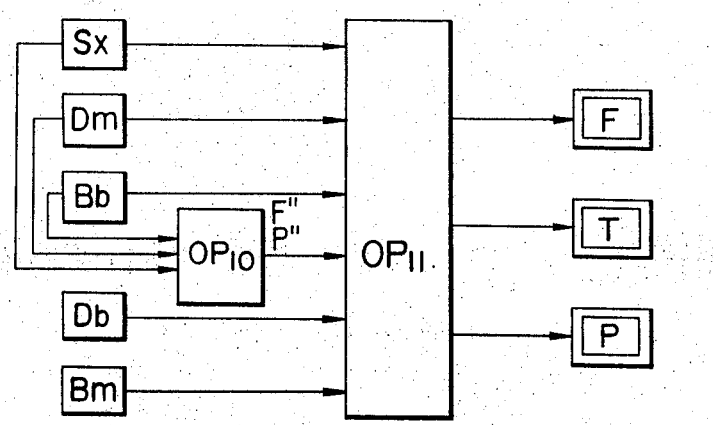

FIG. 7 illustrates an embodiment having a single program of which the instruction is favor toward the attribute factor in which the arithmetic unit performs the functions of defining a relationship among the exposure control parameters, F, T, P, and of determing their respective values, consisting of $OP_{10}$ and $OP_{11}$. In the usual flash photography, the exposure amount based on the flash illumination is dominant in the exposure amount assigned to the principal object so that it can be controlled by the adjustment of the two exposure control parameters, P, F, while the exposure amount assinged to the subordinate object depends chiefly on the intensity of ambient natural illumination, so that it can be controlled by the adjustment of the two exposure control parameters, F, T. In this aspect, the instant arithmetic unit is so constructed that the first arithmetic subunit $OP_{10}$ performs the function of determining initially the approximate values of exposure control parameters F, T, P, and the resultant outputs are then introduced into the second arithmetic subunit $OP_{11}$. Responsive to all of the inputs, the second arithmetic subunit $OP_{11}$ derives the values of the exposure control parameters, F, T, P, as the outputs, which if necessary are compensated thereby to ultimate values to effect an optimum exposure over the entire range of luminance of the subject being photographed. With the arithmetic unit of such construction described above, the thus computed exposure parameter values F, T and P not only satisfy equations (18), but also will be sometimes nearly equal to those determined without utilizing the instant embodiment by an empirical exposure evaluation approach such that the values of exposure control parameters F, T, P are evaluated in disregard to the influence of ambient illumination on the principal object as well as the influence of flash illumination on the subordinate object.

The operation of the arithmetic subunits $OP_{10}$ and $OP_{11}$ will now be explained inmore detail. Responsive to the inputs representing film sensitivity Sx, principal object distance Dm, and subordinate object brightness Bb, the arithmetic subunit $OP_{10}$ derives approximate values of the exposure control parameters, F, T, P, namely, preliminary values F'', T'', P'' based on formulae $F'' = 1/Dm \sqrt{rd/\pi K \cdot P'' \cdot Sx} = \sqrt{T''} \sqrt{Sx \cdot Bb/K}$ obtained by substituting into equations (18) $C = 0$ and $Cf = 0$ (or $Bm = 0$, $Db = \infty$). These formulae cannot determine the absolute values of exposure control parameters, F, T, P, so that the arithmetic subunit $OP_{10}$ is provided with a program which permits at least one of F'', T'', P'', or a relationship among them to be temporarily determined. For example, if a program is made such that the value P'' is equal to the maximum flash energy destined for the associated flash device itself, or to a predetermined value smaller than the maximum one, the operation of the arithmetic unit will be simplified.

With the arithmetic subunit $OP_{10}$ of such construction, the approximate values F'', T'', P'' derived as its outputs will provide correct exposure for both of the principal and subordinate object luminances when the photographic subject situation encountered is positioned at $Db = \infty$ and $Bm = 0$. Introduced into the second arithmetic subunit $OP_{11}$ are the outputs of the first arithmetic subunit $OP_{10}$, the same information as those introduced into $OP_{10}$ representing S, Dm and Bb, and new information representing Bm and Db. Responsive to these inputs, the second arithmetic subunit $OP_{11}$ performs the function of making an evaluation based on equations (18) to derive the values of exposure control parameters, F, T, P, which when factored into an exposure valve will provide correct exposure over the entire range of luminance of the subject being photographed. The values F, T, P will be nearly equal to their respective values F'', T'', P'' derived as the outputs of $OP_{10}$, except that $C = Bm/Bb = 1$, or $Cf = Dm/Db = 1$. If it so happens that any one of the output values F'', T'', P'' of $OP_{10}$ exceeds the corresponding adjustment range thresholds, this threshold value is derived as an output of $OP_{11}$ while the other two exposure parameter values which are solutions of equations (18) solved by substituting the threshold value thereto are derived by $OP_{11}$ in a manner similar to that described in the embodiment of FIG. 6.

In the foregoing explanation, the first arithmetic subunit $OP_{10}$ is described as being adapted to function under the initial conditions $C = 0$ and $Cf = 0$. However, the initial conditions may be altered to different selections and combinations of C and Cf. When different initial conditions are employed such that $C = \frac{1}{8}$ (the principal object is about three times as dark as the subordinate object) and $Cf = \frac{1}{2}$ (the subordinate object is two times as far as the principal object), the values F'', T'', P'' will be equal to their respective values F, T, P derived as the outputs of $OP_{11}$ which when factored into an exposure value provide correct exposure over the entire range of luminance of the subject being photographed in the counter-lighting situation by using a synchronous flash device under daylight illumination.

Therefore, the arithmetic subunit $OP_{10}$ adapted to function under $C = \frac{1}{8}$ and $Cf = \frac{1}{2}$ may be applied to almost general photographic situations, which may be encountered without taking into account Bm and Bb, or without using the second arithmetic subunit $OP_{11}$ thereby the use of exposure parameter values F'', T'', P'' in the synchronous flash photography under daylight illumination will cause usually little differences in the exposure amount between the principal and subordinate objects. The general photographed situation described above refers to the situation where the synchronous flash illumination as well as daylight illumination are required, and the brightness ratio C and distance ratio Cf are not extremely deviated from the set values, $\frac{1}{8}$ and $\frac{1}{2}$ respectively.

Figure 8:
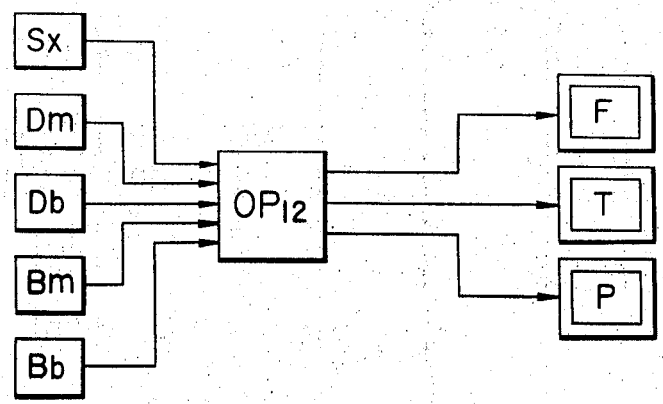

FIG. 8 illustrates an embodiment of the exposure control system of stored program type in which an arithmetic unit $OP_{12}$ performs the function of defining a function of exposure control parameters, F, T, P, and of determining their individual values. Responsive to the inputs representing Dm, Bb, Db, Bm, and Sx, the arithmetic unit $OP_{12}$ derives the values F, T, P as the outputs. The arithmetic unit $OP_{12}$ has an arithmetic subunit incorporated therein for performing the function of allowing for a program besides another arithmetic subunit for performing the function of computing equations (18). As has been already mentioned, if a combination of F, T, P satisfy equations (18), the entire subject will be correctly exposed, but the indivudal values of F, T and P cannot be determined by equations (18) alone. Therefore, to determine the individual values, a certain program, or an additional function with respect to at least one of F, T, P is necessary. This requirement may be explained mathematically as follows.

In an orthogonal three-dimentional coordinate system consisting of the F coordinate axis, T coordinate axis and P coordinate axis, the solutions of equations (18) decided by $Dm$, $Db$, $Bm$, $Bb$ and $Sx$ are on a line passing through the original point. Any point on the line satisfies equations (18) and the coordinates of the point correspond to a combination of the values of exposure control parameters, F, T, P, which provides correct exposure over the entire range of luminance of the subject being photographed. Therefore, it is apparent that the intersection at which this line meets a predetermined surface, that is, the program is a combination of solutions which provide correct exposure over the entire range of luminance of the subject to be photographed. Therefore, an alternative explanation as to the embodiments of FIG. 2, FIG. 3 and FIG. 4, may be made as deciding an intersection at which the line decided by equation (18) meets any surface of said program intersecting perpendicularly the F, T, or P coordinate axis respectively, but being independent of $Dm$, $Db$, $Bm$, $Bb$ and $Sx$. The embodiments of FIG. 5, FIG. 6, and FIG. 7 may be alternatively explained as deciding an intersection at which the line of equation (18) meets the surface having an relation to any one of $Dm$, $Db$, $Bm$, $Bb$ and $Sx$. In every case, the determination of the ultimate outputs is based on the output temporarily positioned on the surface. The group of solutions of equations (18) makes the line extending infinitely from the original point. But in the practical case, the adjustment of the diaphragm value F to less than 0.5 is impossible, usually ranging from 1.4 to 22, so that said line is of a limited range (optimum line position). Therefore, said program adapted for use with equations (18) should be decided by taking into account $Dm$, $Db$, $Bm$, $Bb$, $Sx$, or the adjustment range threshold of each exposure control parameter, F, T, P, dependent on the mechanism of a given exposure control device. Otherwise, it would happen that said arithmetic does not perform the function of deriving any value notwithstanding the existance of a combination of solutions which provides correct exposure for the entire range of luminance of the subject being photographed. Thus, the formation of the program (the program surface portion) required caution. The program may be expressed in the form of a plane or curved surface, or in the form of a combination of one or more planes and curved surfaces. For example, the program may be formed as including an instruction that when the subordinate object rightness level Bb is larger than a predetermined level, the exposure interval be held constant at 1/60 second, in conformance with which F and P may be adjusted. With an instruction that the level Bb is smaller than the predetermined one, the exposure interval is allowed to vary to an appropriate value larger than 1/60 second (long time exposure). The program may be formed as a function with respect to at least one of F, T, P, and if necessary with respect to one or more factors selected from $Dm$, $Db$, $Bm$, $Bb$, and $Sx$. As several examples of the program may be mentioned the followings.

A: The decrease of the principal object distance with decrease in the area of diaphragm aperture opening as well as in the light energy of a flash device.

In conventional flash photography, as the distance to the subject of photographic principal intrest decreases, the amount of flash energy is decreased, while maintaining the diaphragm value constant, or the area of the diaphragm aperture opening is decreased, while maintaining the amount of flash energy constant, but either technique has drawbacks. Example A mediates between the conventional techniques described above. According to example A, the adjustment ranges of the flash device and diaphragm means are fully utilized so that the number of photographable situations can be increased. For example, a program is formed to perform the computation corresponding to $F = 8/\sqrt{Dm}$. With this program, the arithmetic unit $OP_{12}$ having an arithmetic subunit for performing the computation corresponding to equations (18) derives values T and F as the outputs in conformance with said value F. The computed light energy value P reduced to the corresponding to guide number G is expressed as from equations (18) and $F = 8/\sqrt{Dm}$, $G = 64/F \sqrt{1 - C/1 - C \cdot Cf^2} = 8 \sqrt{Dm} \sqrt{1-C/1-C \cdot Cf^2}$. In the case of the brightness ratio $C = 0$, $G = 8\sqrt{Dm}$. This shows that the diaphragm means and flash means contribute in almost equal ratio the exposure amount adjustment in accordance with the distance $Dm$ to effect a consistent exposure.

B: A program which permits the arithmetic unit to perform the computation corresponding to $F = 5\sqrt{G/Dm}$ (G is a function of D and $Sx$).

In this case, the output of $OP_{12}$ is $G = 25 (1 - C)/(1 - C \cdot Cf^2)$, $$F = 25/Dm \sqrt{1-C/1-C \cdot Cf^2} \quad T = (25/Dm)^2 \cdot K/SxBb \sqrt{(1-C)(1-Cf^2)}/(1 - C \cdot Cf^2).$$

Several alternative programs may be formed according to the purposes of usage.

This embodiment is intended to include also the case where an intersection between the program surface portion and the optimum line portion is determined simultaneously, and the case where an optimum line portion is first determined and then selected from the combinations of the outputs are the ones present on the program surface as the ultimate outputs, F, T, P.

FIG. 9 shows an example embodying the apparatus corresponding to FIG. 2. Detailed explanations shall be given hereinafter.

Generally, an operation amplifier has functions of addition, subtraction, multiplication, differential calculus, and integral calculus, and it is thus possible to provide a camera satisfying the condition of the formula (18) by combining circuits having one or more of these functions. The embodiment shown in the drawing shows the case of an electronic shutter attached with a daylight synchronous flash in which the exposure time T and the amount of flash light are used as values to be controlled. Various modifications may be used.

In the figure, numerals 1 and 2 are an operation circuit outputing the resistance ratio of a pair of input resistances. The operation circuit 1 is an operation amplifier provided with resistors RDb and RDm which are adjustable to a resistance value in proportion to the unit voltage source +e and the distance of the subordinate and main objects to be photographed. The operation circuit 2 is an operation amplifier provided with a photo-resistors RDb and RBm which give a resistance value in proportion to the unit voltage source −e, the brightness of the subordinate and main objects to be photographed. The output of the operation amplifier 1 is denoted as −Cf, while the output of the operation amplifier 2 is +C. When the output of the operation amplifier 1 is supplied to a pair of input terminals of the multiplier 3, an output of $Cf^2$ is obtained from the output terminal. The multiplier 3 is composed of four operating amplifiers, three resistors having a resistance value $R_1$, two resistors having a resistance value of $R_1/2$, three resistors having a resistance value $R_2$ and three transistors connected at their bases. When the output of the multiplier 3 and the output of the operation amplifier 2 are supplied to a pair of input terminals of a multiplier 4 similar to the multiplier 3, an output of $C \cdot Cf^2$ is obtained from the output terminal.

Numerals 5, 6 and 7 are respectively a subtracter of [1 − (input)] composed of a unit voltage source +e, and an operation amplifier with four resistors having a resistance value of $R_1$. The output of the multiplier 3 is supplied to the subtracter 5 to produce an output of $(1 − Cf^2)$, and the output of the operator 2 is supplied to the subtracter 6 to produce an output of $(1 − C)$, and the output of the multiplier 4 is supplied to the subtracter 7 to produce an output of $(1 − C \cdot Cf^2)$.

Numerals 8 and 9 show a three-value input type multiplier in which three initial stage operation amplifiers are provided, and three initial stage operation amplifiers similar to the two initial stage operation amplifiers of the multiplier 3 are connected to the contact point Y of the multiplier 3.

Such an electric potential that its proportional relationship normalized with the diaphragm aperture value inputted in an association with the diaphragm device is inputted into the two terminals of one of the multiplying units, while the constant K is inputted into the other one terminal, and the output of $F^2 \cdot K$ can be obtained from the output terminal of the same.

The output $(1 − C \cdot Cf^2)$ of a subtracting unit 7 is an electric potential that its proportional relationship is normalized with the sensitivity $Sx$ of the film used and such electric potential is that its proportional relationship is normalized with the brightness Bb of a subordinate object are inputted into each input terminal of the other multiplying unit 9, respectively, and the output of $Sx \cdot Bb (1 − C \cdot Cf^2)$ can be obtained from the multiplying unit 9.

The output of the above mentioned multiplying units 8, 9 will be supplied into a dividing unit 11 and will become the output of $F^2 \cdot K(1 − Cf^2)/Sx \cdot Bb(1 − C \cdot Cf^2)$. This output is such electric potential as providing the time T. The circuit of the dividing unit 11 may be of identical structure with that of the multiplying unit 4 other than that one of the initial stage operation amplifier of the multiplying unit 4 is separated from the connecting point Y and is connected with the grounding terminal X of the secondary stage operation amplifier and further another grounding resistance $R_2$ is connected between the grounding terminal X and the grounding. The divisor information is supplied to the terminal X side and is subject to a subtracting process in the secondary stage operation amplifier.

The output of the dividing unit 11 drives and controls the shutter through an integrating unit 12 and a comparator unit 13. At the integrating unit 12, there is provided a resistor with resistance value $R_1$, an operation amplifier and a time constant capacitor $C_1$ being parallel with the shortcircuiting switch $S_1$ which is connected between the input terminal and output terminal of said amplifier. The comparator unit 13 has a reference voltage source −eR, a resistor with resistance value $R_1$ and an operation amplifier. At the time when the output of the integrating unit 12 which starts integrating computation by the shortcircuiting switch $S_1$, which is changed over from close to open in synchronism with the shutter opening signal and becomes equal to the electric potential of the reference voltage source −eR, the output of the comparator unit 13 reverses the function of a shutter closing control magnet $M_1$ through a current booster 14 thus controlling the shutter closing function. Next, explanations shall be made on the computation for control of the amount of light emitted. As the outputs $(1 − C \cdot Cf^2)$, $(1 − C)$ of the subtracting units 6, 7 are supplied into a dividing unit 15 which is similar to the dividing unit 11, the output $(1 − C \cdot Cf^2)/(1 − C)$ can be obtained and is supplied into an evolution unit 16. The evolution unit 16 consists of three operation amplifiers, four resistors with resistance value $R_1$, three resistors with resistance value $R_2$, two resistors with resistance value $R_3$, two resistors with resistance value $R_4$, four transistors and two diodes.

Such electric potential that its proportional relationship is normalized with the diaphragm aperture value F, the distance Dm to the principal object is supplied into a multiplying unit 17 and its output $F \cdot dm$ is supplied into a dividing unit 18. The output of the above mentioned evolution unit 16 is also supplied into the dividing unit 18, and as a result the output electrical potential of $\{F \cdot Dm/ \sqrt{(1 − C \cdot Cf^2)/(1 − C)}\}$ can be obtained. This output is supplied as a reference electric potential of the operation amplifier 19 which functions as a comparator unit, and at the same time, the bleeder potential of a high resistance bleeder circuit 21 is inputted in the above mentioned operation amplifier 19. Then, its output will have an electric charge charged at a main capacitor 22 always corresponding with $P = Kn\{F \cdot Dm/ \sqrt{(1 − C \cdot Cf^2)/(1 − C)}\}^2$ with the function of the control device 21 of the switching device, etc. within the feedback path, and a flash bulb 23 is actuated to emit light by the ON action of a synchronizing switch $S_2$ of a trigger circuit 24 which shortcircuits the discharge path of the discharge tube 23, thus the prescribed amount of emitted light can be obtained. For the constant Kn here, such characteristics correction as including a film sensitivity Sx which is set at a potentiometer Rn is provided, It is needless to say that appropriate associated relationships will be required between the switch $S_1$, the magnet $M_1$, and the switch $S_2$. Thus, such daytime synchronizing flash electronic shutter of diaphragm aperture preference type as having the exposure time T and amount P of light emitted as the factors to be controlled is completed. Numeral 25 is a booster, and numeral 26 is a battery for a flash device. The switch $S_3$ becomes OFF in association with the ON action of the switch $S_2$, for example is set as ON in association with the shutter charge. The portion as being described as similar in the explanation of computing units may be such that the polarity of the compression transistor of the feedback path is modified according to the polarity of the input signal. Further as the square computing operator 3 and the evolution unit 16, such units may be used as having ordinary circuit arrangement using the characteristics of elements such as diodes, etc. When RDb, RDm are taken out from a distance ring as the distance information input, such mechanism will be necessary that they are supplied together with the distance information being adjusted to the principal object, while such distance information is adjusted to the subordinate object through a distance meter finder is stored and retained as shown in FIG. 10. Further, in the case of a single lens reflex camera as shown in FIG. 9(c) and (d), a switch $S_4$ and a capacitor $C_2$; a switch $S_5$ and capacitor $C_3$ are connected, respectively, between the dividing unit 11 and the integrating unit 12 (refer to FIG. 9(c)), and between the dividing unit 18 and the operation amplifier 19 (refer to FIG. 9(d)), wherein the switches $S_4$, $S_5$ are for example made OFF with the mirror up and are stored and retained, while they are reset to ON with the mirror down. At this time, the result of computation is stored at the capacitor $C_M$ and is held by the high input resistance of FET transistor and stored then during the subsequent photographing action. The magnet $M_1$ or the flash tube 23 is controlled by the voltage generated at the resistance $R_{M3}$ that is the stored value of the capacitor $C_M$.

Figure 10A:
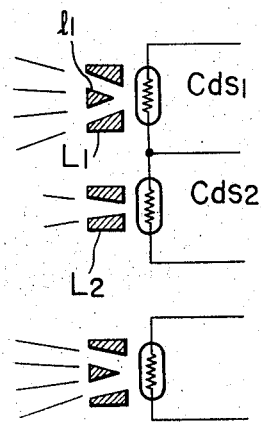
Figure 10B:
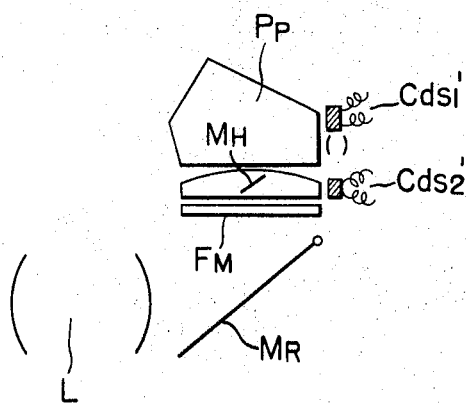

FIG. 10(a) is to show a light receiving part for sensing the brightness Bm of a principal object, and the brightness Bb of a subordinate object of the abovementioned object, wherein $CdS_1$, $CdS_2$ are photoconductive elements provided at a camera and $L_1$, $L_2$ are limiting members for angle of light received provided in front of the $CdS_1$, $CdS_2$, respectively. The member $L_1$ receives luminous flux of a subordinate part of an object which transmits through the cylindrical light transmitting part of a ring shape having a light shielding part $l_1$ at its center as shown in the drawing, and converts the brightness signal to the resistance variation thus giving an electrical resistance value signal RBb. On the other hand, since the light transmitting part of the member $L_2$ is directed only toward the principal object portion, the $CdS_2$ gives the brightness information RBm of a principal object, which is impressed to the input of the operation amplifier 2 together with RBb. FIG. 10(b) shows a modified example of FIG. 10(a), showing a light receiving part of a single lens reflex camera, wherein $CdS_1'$, $CdS_2'$ correspond to the abovementioned $CdS_1$, $CdS_2$, respectively. That is the $CdS_2'$ senses the brightness Bm of the principal object part by the half mirror $M_M$, which reflects the center part only of the object image which is focused on the mat plane $F_M$ through a photographing lens L, a mirror $M_R$, that is the principal part of the object, on the other hand, the $CdS_2$ is positioned at an emergence part of a pentagonal prism $P_p$ and senses the brightness of the object in an even manner, thus chiefly senses the brightness Bb of the subordinate part of the object.

Figure 10C:
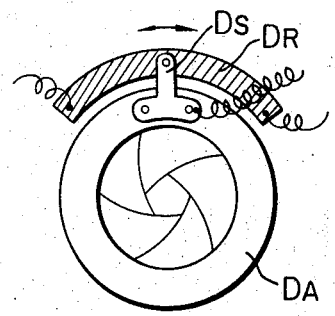

FIG. 10(c) is to show a concrete arrangement to impress the above mentioned diaphragm aperture information F to an adding unit 8, wherein $D_A$ shows a diaphragm device of conventionally shown type, $D_S$ shows a movable sliding piece fixed to the movable ring of the diaphragm device $D_A$, and $D_R$ shows a resistance member forming a variable resistor together with the sliding piece $D_S$. Said signal F may be set to a prescribed resistance value in an association with the adjusting of the diaphragm device $D_A$ to a prescribed aperture value, forming an electric signal F by said resistance element.

Figure 10D:
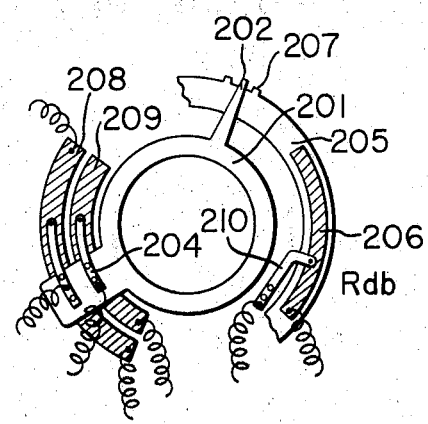

FIG. 10(d) shows a concrete sample of the variable resistors RDm, RDb which show such resistance values as corresponding to the distances to the principal part and subordinate part of an object, wherein 201 shows a distance ring formed of insulating material and associated with the focal point setting ring of a camera, 202 is a projection of said ring 201, and 203, 204 shows movable contact pieces fixed on the ring 201. Numeral 205 is a manually movable follower ring forming a resistance body 206 and a positioning part 207 on said ring. Numerals 208 and 209 show resistance bodies.

In the same drawing, when the distance ring 201 is so set as focusing on the subordinate object part, then the positioning part 207 of the ring 205 is made to match with the projection of the ring 201, the distance information RDb to the subordinate object part can be obtained between terminals of the fixed contact 210 and the resistance body 206. Next, when the ring 201 is set by focusing action for the principal object part, the movable contacts 203, 204 move, the above mentioned resistance RDm (204 - 209) having such resistance value as corresponding to the distance to the principal object part and the resistance for the distance signal Dm (as a circuit input) are formed between the resistance bodies 208 and 209.

The examples shown above are to show concrete arrangements based on the block diagram shown in FIG. 2.

Figure 11:
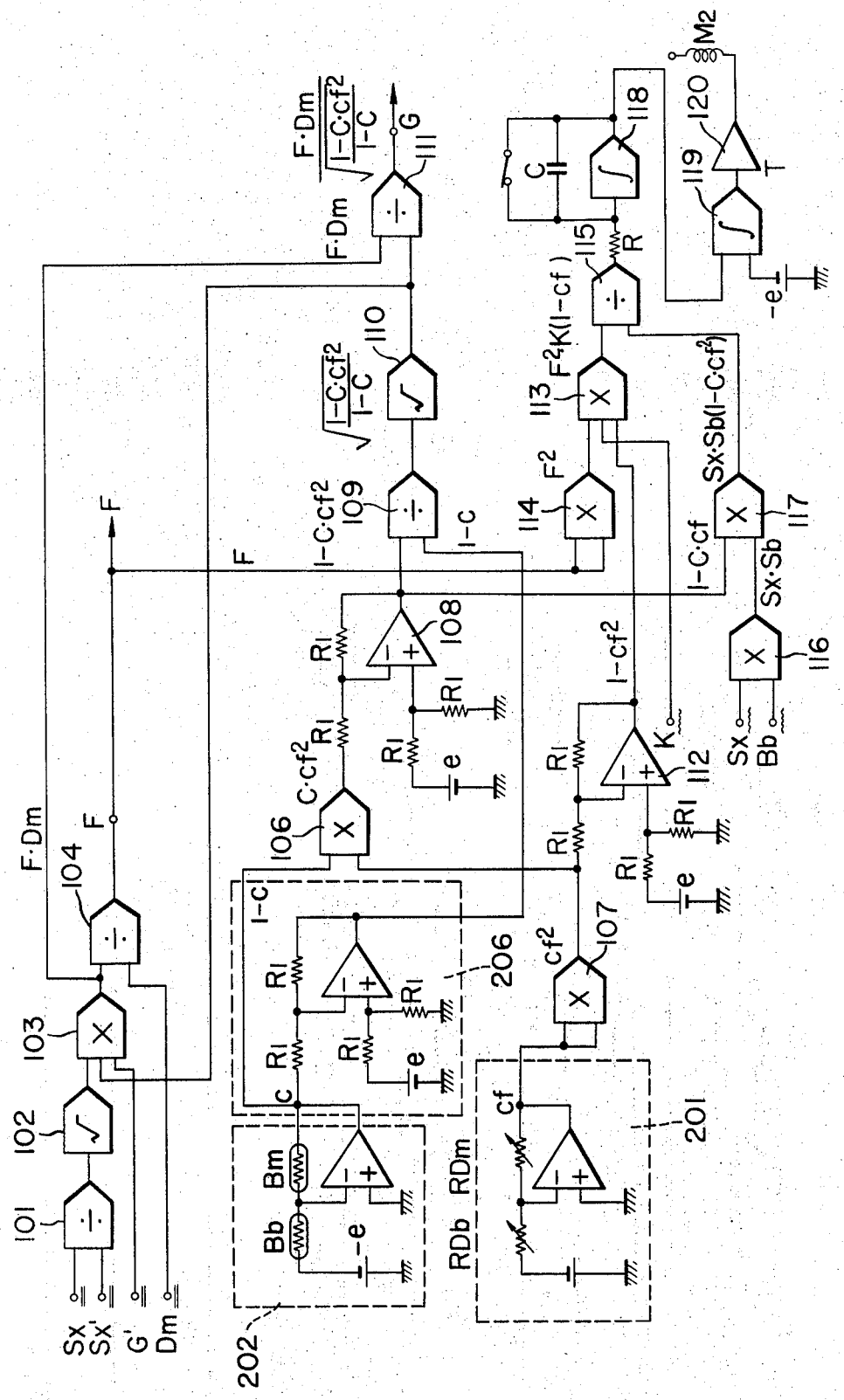

FIG. 11 shows a concrete example of arrangement of the above mentioned block diagram particularly as shown in FIG. 8 wherein the three outputs, F, T, P can be obtained by Bm, Bb, Dm, Db, Sx according to the program provided at inside of the computing unit, and its process of computation has similarity with the flash preference type example shown in the block diagram of FIG. 6.

This concrete example is so made that first the diaphragm aperture value F is determined then the amount P of light emitted and the exposure time T are determined. While in the example shown in FIG. 6 when the brightness ratio is $C = Bm/Bb = 0$ and the distance ratio is $Cf = Dm/Db = 0$, the diaphragm aperture value F is determined, considering the film sensitivity Sx and the distance Dm to the principal object, in such manner that optimum exposure is obtained as the amount P of light emitted is at the value P'. This prescribed value is equal to the maximum amount of light determined by the flash device itself, the diaphragm aperture value F in this example is determined taking into consideration further the C and the Cf also. The amount P of light emitted can be expressed by the guide number G through the film sensitivity Sx, and in this example, the above-mentioned P' is expressed by the guide number G' at a certain film sensitivity Sx' (for example ASA 100), and the circuit is made using the same. The relation between G', P', Sx' will be $G' = \sqrt{rd/\pi K \cdot P' \cdot Sx'}$ as will be derived from the abovementioned equation (10), and in the case $Sx \neq Sx'$, the guide number G'' as corresponding to an assumed amount of light emitted will be $G'' = G' \sqrt{Sx/Sx'}$.

In the same drawing, numerals 101, 102, 103, 104 show computation circuits for dividing square root, multiplying, and dividing, respectively, wherein the sensitivity $Sx$ of the film to be used and the above-mentioned film sensitivity $Sx'$ are supplied into the input terminal of the dividing circuit, wherein dividing is done. Further, square root is obtained by the square root circuit 102, then the $\sqrt{Sx/Sx'}$ component against 103 is outputted. Further, the above-mentioned $G'$ and the output of the root square circuit are supplied into the multiplying circuit 103. The output of the circuit 103 which is obtained by multiplying the $G'$ as computed with the sensitivity $Sx$ of the film to be used (that is the $G''$ mentioned above) with the output of the circuit 110, is divided with the distance $Dm$ to the principal object in the dividing circuit 104. Thus, the effective diaphragm aperture value F is computed.

On the other hand, the $(1 - C)$ component is outputted to the output of the brightnesses $Bm$, $Bb$ of the object by such circuits as corresponding to the computing circuits 2, 6 in the above-mentioned examples, and the output thereof is impressed to the input of the dividing circuit 109. On the other hand, the output of the computing circuit 202 is multiplied with the component $Cf^2$ of the output of the multiplying circuit 107 by the multiplying circuit 106, thus the $C \cdot Cf^2$ will be outputted. By the comparator circuit 108, the dividing circuit 109, the root square circuit 110, the dividing circuit 111, the $F \cdot Dm / \sqrt{1 - C \cdot Cf^2 / 1 - C}$ component is outputted from the output of the dividing circuit. This component corresponds to the amount of light emitted in the above-mentioned equation (10).

Figure 9A:
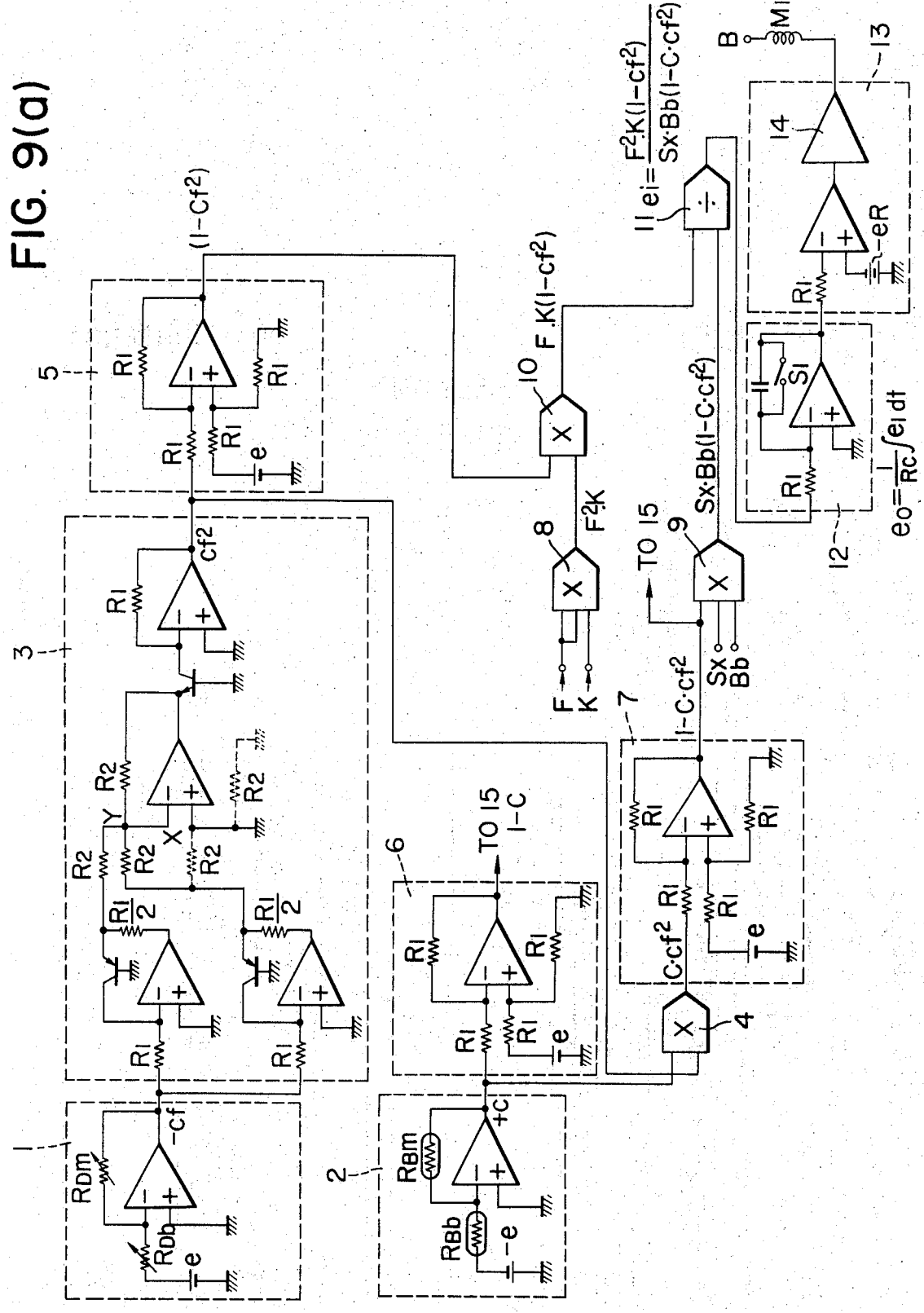
Figure 9B:
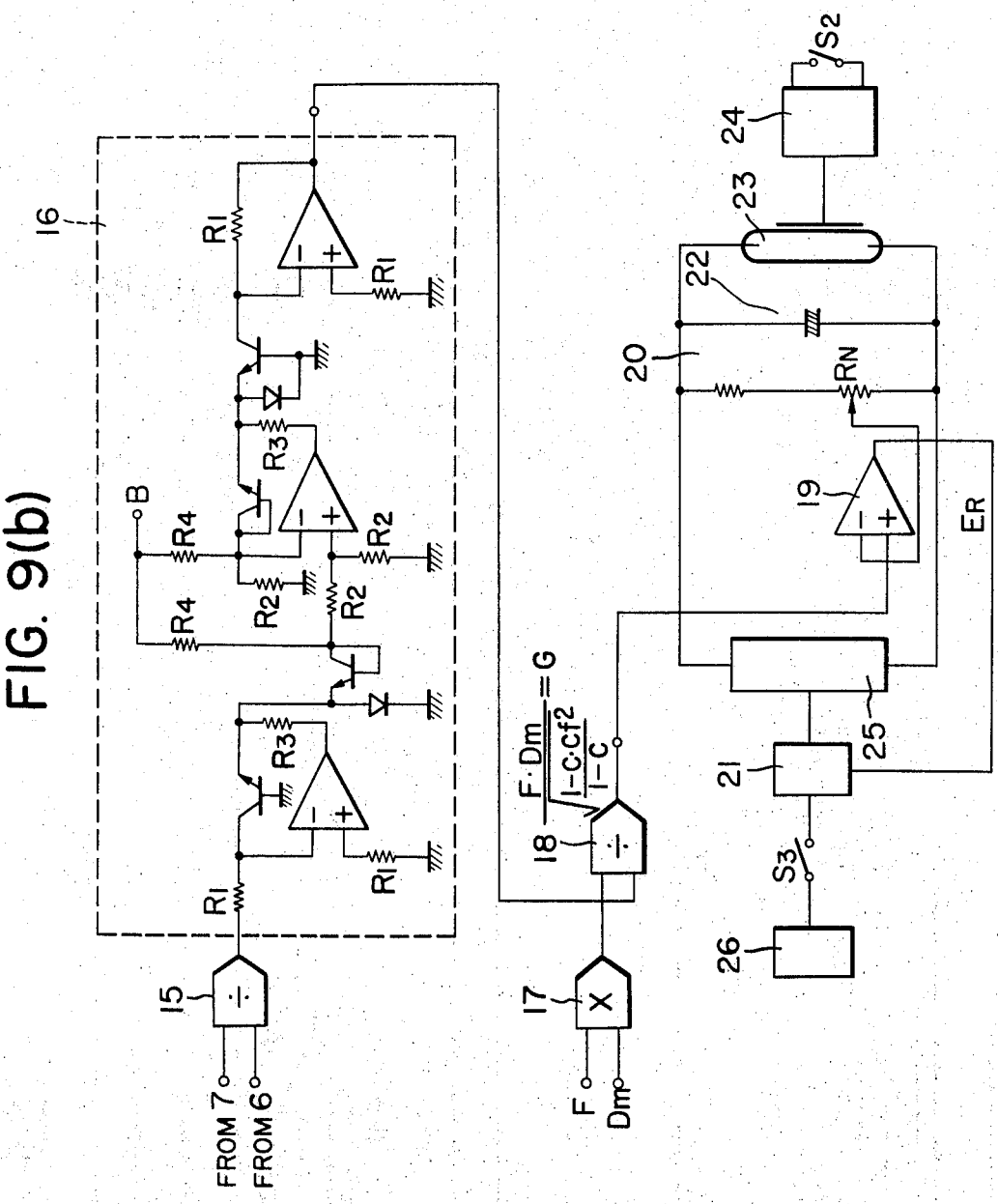
Figure 9C:
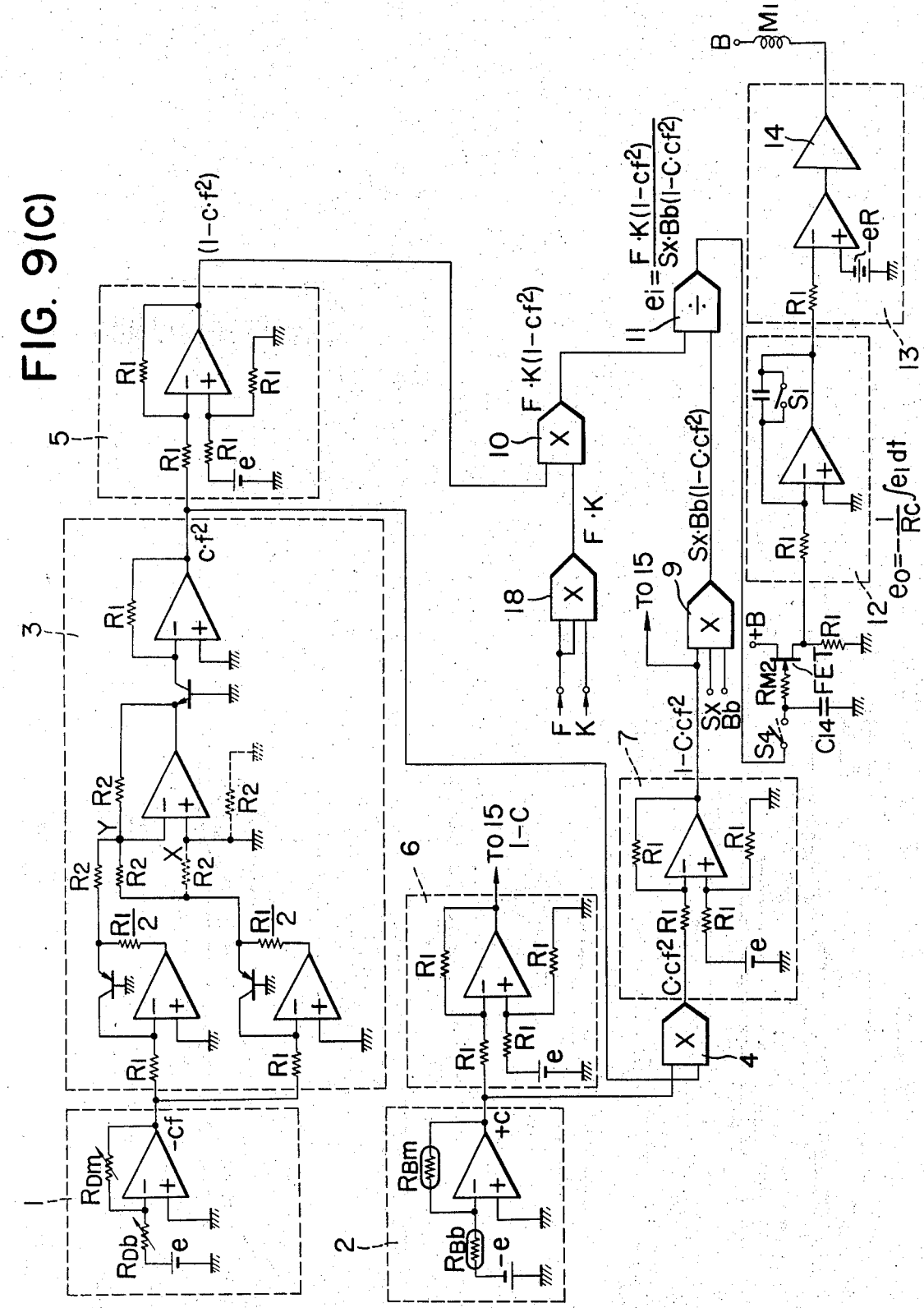
Figure 9D:
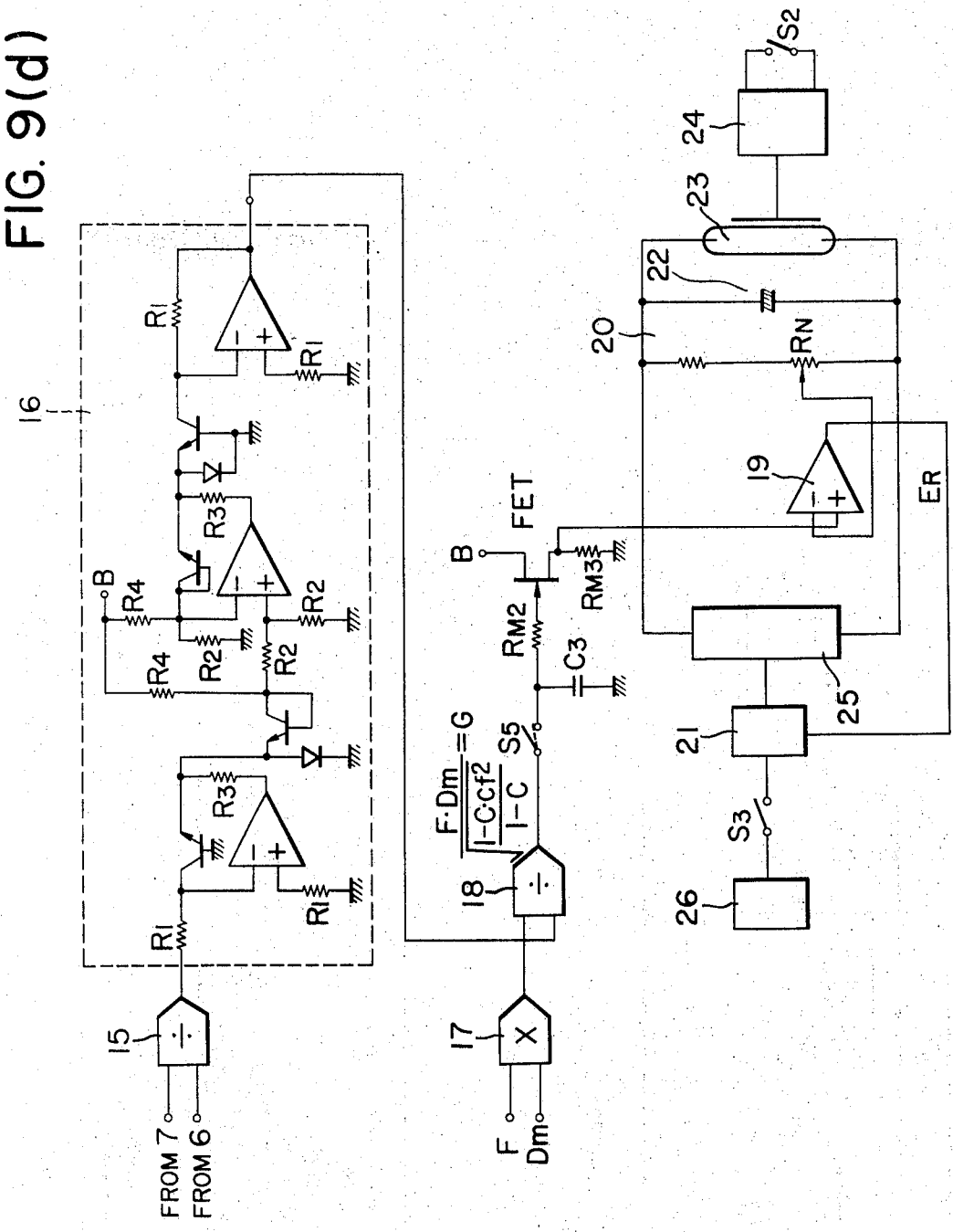

The amount of light emitted P being thus computed is impressed to a strobe device and as shown in FIG. 9(b) it is adjusted by making the amount of light emitted by the strobe device variable by the charged voltage of the main capacitor in the strobe device variable.

While the output $Cf^2$ of the multiplying circuit 107 is supplied to the comparator circuit 112, the multiplying circuit 113, the multiplying circuit 113 will have the output $F^2$ of the multiplying circuit 114, and such signal as corresponding to a certain constant K multiplied therewith, thus $F^2K(1 - Cf^2)$ is obtained at its output. Further, the product of multiplication of the sensitivity $Sx$ of the film to be used by the brightness $Bb$ of the subordinate object is given to the input to the multiplying circuit 116, and the $Sx \cdot Bb (1 - C \cdot Cf^2)$ component. Further, the product of the film sensitivity $Sx$ to be used and the brightness of the subordinate object to be photographed is taken for the multiplying circuit 116, and the $SxBb(1 - C \cdot Cf^2)$ component is supplied to the input of the dividing circuit 115.

The output of the dividing circuit 115 actuates the shutter closure magnet through the integrator 118, the comparator 119 and the current booster 120 just as in the same manner as in the preceding examples.

The above embodiments are to show an example satisfying purely electrically the formula (18). In case of a camera incorporated with a mechanical auto-flash mechanism in which the diaphragm aperture is adjusted in association with the object distance adjustment corresponding to a predetermined guide number, if the variable resistor, for example, is associated to the diaphragm device, the distance adjusting ring, the guide number adjusting ring, etc. so as to set a resistance value corresponding to the adjusted diaphragm aperture, the adjusted distance or guide number signals corresponding to $F \cdot Dm$ and signals corresponding to the diaphragm aperture F are obtained from the variable resistor, and thus a very simplified construction can be obtained.

It is possible to convert the F value obtained in the above example by applying an ordinary EE device in which the obtained F value is supplied to the input of the comparison circuit, for example, to swing the meter, etc. by its output and to detect the position of the meter pointer and the diaphragm aperture is adjusted.

As above described, the present invention is very useful and advantageous as it is possible to give a proper exposure to the whole of the object to be flash photographed by measuring the distances to the main and subordinate portions of the object and their brightness.

What is claimed is:

1. Exposure control system for flash photography comprising: illuminating means to produce an amount of flash light P for a main portion and a subordinate portion of an object to be photographed, shutter means opening and closing in association with the light of the illumination means, and shutter means having an opening and closing time T, distance measuring means for measuring the distance $Dm$ to the main portion of the object and the distance $Db$ to the subordinate portion of the object, diaphragm means cooperating with the shutter means and producing a diaphragm value F for adjusting the diaphragm opening, brightness measuring means for measuring the brightness $Bm$ of the main portion and the brightness $Bb$ of the subordinate portion of the object; operating means for adjusting at least two of the three parameters of the amount of flash light P, the time T of the shutter means, and the diaphragm value F of said operating means responsive to the distance information obtained by the distance measuring means and the brightness information obtained by the brightness measuring means; said operating means being responsive to the natural light and flash light supplied to the main and subordinate portions of the object.

2. Exposure control system for flash photography according to claim 1, wherein said operating means comprises means for determining the shutter time T and the amount of flash light P having a diaphragm value F in accordance with the following equations:

$$1/Dm \cdot \sqrt{rd/\pi K \cdot P \cdot Sx} \cdot \sqrt{(1 - C \cdot Cf^2)/(1 - C)} = F \quad (A)$$

$$\sqrt{T} \cdot \sqrt{SxBb/K} \cdot \sqrt{1 - C \cdot Cf^2 / 1 - Cf^2} = F \quad (B)$$

in which $C = Bm/Bb$, $Cf = Dm/Db$, rd is the diffusion reflective ratio of an object, $Sx$ is the film sensitivity and K is a constant.

3. Exposure control system for flash photography according to claim 1, wherein said operating means comprises means for determining the diaphragm value F and the amount of flash light P having a shutter time T in accordance with the following equations:

$$1/Dm \quad \sqrt{rd/\pi K \cdot P \cdot Sx} \quad \sqrt{(1 - C \cdot Cf^2)/(1 - C)} = F \quad (A)$$

$$\sqrt{T} \cdot \sqrt{SxBb/K} \cdot \sqrt{1 - C \cdot Cf^2/1 - Cf^2} = F \quad (B)$$

in which $C = Bm/Db$, $Cf - Dm/Db$, $rd$ is the diffusion reflective ratio of an object, $Sx$ is the film sensitivity and $K$ is a constant.

4. Exposure control system for flash photography according to claim 1, wherein said operating means has a first operating circuit comprising means for supplying the diaphragm value F in accordance with the following equation, with a given amount of flash light P of the illuminating means:

$$1/Dm \quad \sqrt{rd/\pi K \cdot P \cdot Sx} \quad \sqrt{(1 - C \cdot Cf^2)/(1 - C)} = F$$

and a second operating circuit comprising means for supplying the shutter time T in accordance with the following equation, using the diaphragm value supplied by the first operating circuit as an operating input:

$$\sqrt{T} \cdot \sqrt{SxBb/K} \cdot \sqrt{1 - C \cdot Cf^2/1 - Cf^2} = F$$

5. Exposure control system for flash photography according to claim 8, wherein said operating means comprises an operating circuit having means for determining at least one of a temporary diaphragm value $F'$, a temporary shutter time $T'$ and a temporary amount of flash light $P'$, by using at least two of said distance information $Dm$, $Db$, said brightness information $Bm$, $Bb$ and the film sensitivity, said operating means having means for determining the diaphragm value F the shutter time T and the amount of flash light P for providing a desired exposure responsive to the temporary exposure value obtained by said operating circuit.

6. Exposure control system for flash photography according to claim 1, wherein said operating means comprises a group of operating circuits.

7. Exposure control system for flash photography comprising illuminating means to produce an amount of flash light P for a main portion and a subordinate portion of an object to be photographed, shutter means opening and closing in accordance with the light of the illumination means and having an opening and closing time T, distance measuring means for measuring the distance $Dm$ to the main portion of the object, diaphragm means cooperating with the shutter means producing a diaphragm value F for adjusting the exposure amount, light measuring means for measuring at least the brightness $Bb$ of the subordinate portion of said object; and operating means including means for determining at least two of the parameters of the amount of flash light P of the illuminating means, the opening and closing time T of the shutter means and the diaphragm value F of the diaphragm device in accordance with the following equation:

$$F = K/Sx \cdot Fom/Bb \ (F^2/Fom^2 - 1) = K/Sx \cdot 1/B \ (F^2 - G^2/Dm^2)$$

in which $Fom = G/Dm$ $G = \sqrt{rd/\pi K \cdot P \cdot Sx}$, $Dm$ and $Bm$ being obtained by said distance measuring means and the light measuring means; respectively, said operating means providing uniform exposure to an object having equal brightness $Bm$ and $Bb$ and distance $Dm$ and $Db$.

* * * * *